United States Patent
Painter

(10) Patent No.: US 7,860,819 B1
(45) Date of Patent: Dec. 28, 2010

(54) EXTENSIONS TO SEMANTIC NET

(75) Inventor: Evan V. Painter, Albany, CA (US)

(73) Assignee: TVWorks, LLC, Philadelphia, PA (US)

( * ) Notice: Subject to any disclaimer, the term of this patent is extended or adjusted under 35 U.S.C. 154(b) by 408 days.

(21) Appl. No.: 10/409,910

(22) Filed: Apr. 8, 2003

Related U.S. Application Data

(60) Provisional application No. 60/370,964, filed on Apr. 8, 2002.

(51) Int. Cl.
*G06N 7/00* (2006.01)
(52) U.S. Cl. .......................... 706/55; 706/45
(58) Field of Classification Search .......... 706/12, 706/15, 26, 27, 39, 55
See application file for complete search history.

(56) References Cited

U.S. PATENT DOCUMENTS

| | | | | |
|---|---|---|---|---|
| 4,815,005 | A * | 3/1989 | Oyanagi et al. | 706/55 |
| 5,937,400 | A * | 8/1999 | Au | 706/55 |
| 6,078,348 | A * | 6/2000 | Klosterman et al. | 725/40 |
| 6,751,621 | B1 * | 6/2004 | Calistri-Yeh et al. | 707/100 |
| 6,778,970 | B2 * | 8/2004 | Au | 706/55 |
| 6,944,603 | B2 * | 9/2005 | Bergan et al. | 706/45 |

OTHER PUBLICATIONS

"Generation of Marketing Insights" , (http://www.duke.edu/~mccann/mwb/15semnet.htm, Oct. 9, 1999 as retrieved from the Wayback machine (http://www.archive.org/index.php), pp. 1-11.*
Sowa, John; "Semantic Networks", www.jfsowa.com/pubs/semnet.htm, pp. 1-28.*
Quillian, M. Ross, "The Teachable Language Comprehender: A Simulation Program and Theory of Language", Computational Linguistics, Communications of the ACM, Aug. 1969, vol. 12, No. 8, pp. 459-476.

* cited by examiner

*Primary Examiner*—Donald Sparks
*Assistant Examiner*—Omar F Fernandez Rivas
(74) *Attorney, Agent, or Firm*—Banner & Witcoff, Ltd.

(57) ABSTRACT

A semantic network includes a number of nodes are interconnected to one another through links (e.g., in a subject/verb/target form) representing relationships between the nodes and one or more of the links have one or more variants representing qualifications of the relationships between the nodes. For each link having one or more variants, the variants may be ordered in configurations. Such ordering of the variants in the configurations may be self-described within the semantic network and may determine precedence of those links belonging to the variants. Some of the links of the network may be nodes of others of the links. The interconnection of at least some of the nodes may define a meta-meta model that defines terms in which particular meta models can be defined, each meta model comprising meta facts regarding the nodes of the semantic network.

30 Claims, 1 Drawing Sheet

EXTENSIONS TO SEMANTIC NET

RELATED APPLICATION

The present application is related to and hereby claims the priority benefit of U.S. Provisional Application 60/370,964, entitled "Extensions to Semantic Net", filed Apr. 8, 2002 and assigned to the assignee of the present application.

FIELD OF THE INVENTION

The present invention relates to extensions to semantic net technology, which in one embodiment serves as an architecture for enabling the delivery of technology and applications based upon self-describing information content. Such content may, in one embodiment, be described in data repositories or databases that include metadata about their content.

BACKGROUND

The concept of a semantic network or semantic net is now fairly old in the literature of cognitive science and artificial intelligence. The term "semantic network" dates back to Ross Quillian's Ph.D. thesis (1968), in which he first introduced it as a way of talking about the organization of human semantic memory, or memory for word concepts. The idea of a semantic network—that is, of a network of associatively linked concepts—is, however, very much older.

To get some feel for semantic nets, think of a common, but evocative, word, say, "home". Write it down on a sheet of paper. Now think of some words related to home, say, "owner", or "door". Write down these words in a ring around "home", and join each of them with a line to "home". Now give each line a label that describes the relationship between the two words—for example, the line linking "home" and "owner" might be labelled "lives in". Continue outwards, writing down words relating to "owner", words relating to "door", and so on. What you are constructing is, roughly, a semantic net.

The words of your drawing can be considered "nodes" of your network and the lines connecting these nodes are terms links (or, sometimes, arcs). Links of a semantic net are sometimes directed, meaning that a relationship between nodes exists only in one direction. One way to think of these links is as features of the nodes from which they emanate (the subject) and the nodes at the other end of the link (the target) might be the value of that feature.

Semantic nets thus have been a staple of computer study for a long time, and there has been much work done on traversal and decision algorithms for them. More recently, it has been noticed what a natural fit they make to the notation scheme provided by the Extensible Mark-up Language (XML). Less developed, though, is the use of semantic nets in object model definition and persistence.

SUMMARY OF THE INVENTION

In one embodiment, the present invention provides a semantic network in which a number of nodes are interconnected to one another through links (e.g., in a subject/verb/target form) representing relationships between the nodes and one or more of the links have one or more variants representing qualifications of the relationships between the nodes. For each link having one or more variants, the variants may be ordered in configurations. Such ordering of the variants in the configurations may be self-described within the semantic network and may determine precedence of those links belonging to the variants. Some of the links of the network may be nodes of others of the links. The interconnection of at least some of the nodes may define a meta-meta model that defines terms in which particular meta models can be defined, each meta model comprising meta facts regarding the nodes of the semantic network.

A further embodiment provides a resolution engine configured to parse a meta-meta model of a semantic network to produce therefrom a specification of interconnections of nodes of the network according to a design meta model for a particular application, the meta model comprising metafacts regarding the nodes of the network and the meta-meta model defining terms in which the meta model is defined, wherein the parsing is accomplished by resolving properties, inheritances, containments, cardinalities, validity and/or qualifications of the meta-meta model to enable specification of node types, link interconnections, link attributes and ordering of the link attributes in the network.

DETAILED DESCRIPTION

Figure 1:
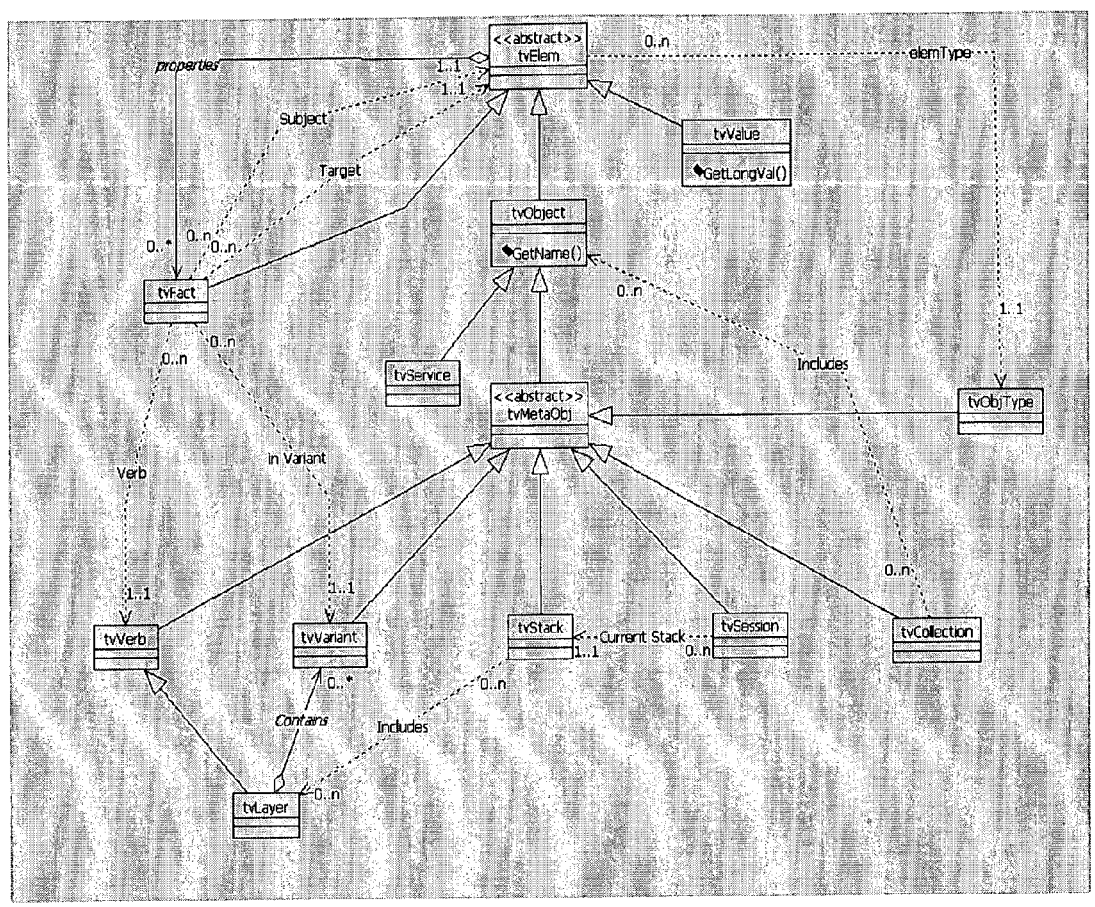
FIG. 1 is a Unified Modeling Language (UML) diagram that illustrates a class structure implementation that supports examples of extensions to a semantic network which are embodiments of the present invention.

The present invention provides a concept, architecture, method and apparatus for extensions to semantic net technology, which, in one embodiment, serves as an architecture for enabling the delivery of technology and applications based upon self-describing information content. More particularly, in one embodiment the present invention provides:

a semantic network in which Links can be conditioned, and sequenced, by "Variants";
  a semantic network in which Links can be treated as nodes by other links, either as subject or target;
  a semantic network which includes a built-in, self-describing meta-meta model;
  a resolution engine that both implements, and exploits, the built-in semantics of Variants, and of the self-describing meta model. Some of these semantics include inheritance, containment, cardinality, validity, and qualification.

When applied in the context of interactive television (iTV), the present invention may support an iTV application object model that describes designs for portable applications for interactive television, that are platform-independent at the core, while platform-exploitative at the edges. This object model could, in one embodiment, feed a generator, to produce executable screens. In such an embodiment, these semantic net extensions underlie the Application Designer provided by MetaTV of Mill Valley, Calif., the assignee of the present invention. Application Designer uses Variants, as defined herein, to represent not only different deployment platforms, but also national languages, re-branding of existing application designs, and seasonal/occasional accents, without wholesale re-design. In the case of Application Designer, if the meta model had been implemented in software directly, instead of using the present semantic net extensions, then every new component and property would have required much more development effort; and, in many cases, revisions to the datastore physical schema.

The present extensions to conventional semantic nets could similarly support an object model for almost any problem space. In other words, although these extensions have been applied in an iTV context, they are equally applicable in other contexts. For example, the present invention may be applied to object modeling spaces and to implementations of widespread semantic nets over the Internet.

The present invention's unique mix of atomicity, internal self-description, and a resolution engine enables technology implementations, such as the Application Designer described herein as illustrative of this invention, to be small, fast, efficient, and flexible. Object databases were initially created because object models of sufficient complexity are cumbersome to represent in relational databases. By moving much of this complexity into the self-description, the present invention leverages smaller, cheaper DBMS systems. Moreover, within a design built-in mechanisms, for instance inheritance with containment replication, such as described below, provide a degree of re-use far beyond conventional "templating". Another benefit, albeit more indirect, of the present invention is that the degree of normalization of the design problem data makes extension modules that function over the information content of the semantic net, such as a Generator module, easier to normalize and maintain.

Benefits such as these are not specific to the MetaTV application, or even design modeling in general. Similar benefits from use of the present invention would be available and achievable in any problem space in which problem data is conditioned and metadata changes frequently. In the following discussion, which is provided purely for illustrative purposes, the concepts, methods and apparatus are described using an embodiment of an object model that describes a design model for an iTV application named MetaTV Application Designer. This explanation should not, however, be read as limiting the more general applicability of the present invention.

A. Conditioning and Sequencing Link "Variants"

By way of example, consider the following information facts held in a semantic net implementation, as expressed in Subject/Verb/Target form, that, by this introduction of the present invention, can now be conditioned by another attribute (object), namely, "Variant".

|  | Subject | Verb | Target | Variant |
|---|---|---|---|---|
| (1) | Mary / | wears / | black / | Winter |
|  | Mary / | wears / | white / | Evening |

The function is such that the resolution of these facts yields only, 'black', whenever the Variant, 'Evening', is either not included, or is sequenced behind 'Winter', in the current Configuration, assuming that 'wears' is singular. Excluding 'Winter', by contrast, or positioning it after 'Evening', would expose only, 'white' as the value of what Mary wears.

The present invention introduces the concept of and method for implementing the notion of a Variant that is an extra attribute of one or more links of the semantic network. Every transaction with the object model that is held in the extended semantic net is resolved through the current Configuration. A Configuration is an ordered stack of Variants. This ordering is itself, part of the self-description held in the model and Links are conditioned by their Variants in 2 ways:

Links that belong to Variants that are excluded from the Configuration are just not visible now.

Among those Variants that are included, their ordering within the Configuration determines the precedence of the Links that belong to them. Precedence matters, because some Verbs are defined as 'Singular'.

Because each property is held separately, each can be "Varianted" independently. For example, if both of the above two 2 Variants mentioned are included, and—

Mary/drinks/Scotch/Evening but, there is no corresponding property for Winter, thus Mary would get her color from Winter, but her drink from Evening.

B. Treating Links as Nodes

Links can be treated as nodes by other links, either as subject or target. Consider, for example:

| (2) | John / | wears / | black |  |  |  |
| (3) |  / | when / | [ Mary/ | wears / | black ] |

Link (3) has other links, for both its subject and its target. The subject of link (3) is link (2); its target is link (1). Link (2) is extended by, and qualified by, link (3).

C. A Built-in, Self-Describing Meta-Meta Model

A built-in, self-describing meta-meta model includes model data for the notions of Type, Verb, Fact (meaning, link, as extended), Variant, Value, inheritance, containment, cardinality, sequence, and meta facts such as

| wears / | Is Singular / | true |
| wears / | Value List / | white |

These allow the logical meta-schema of the problem domain (in the case of Application Designer, the design of iTV screens) to be soft-coded, in these terms, directly in the model, so that the resolution engine knows both how to resolve visibility, and to validate inputs, according to the problem's meta-schema, without hard-coding.

In brief, nodes have Types, links have Verbs, and every Type defines what Verbs it can use, what their target Types are, cardinality, etc. Some of these design domain metafacts may themselves be Varianted, so that not just problem data, but the problem meta-schema, comes in "flavors". For example, wears/Value List/green/Spring would include 'green' as a valid value for the 'wears' Verb, only in case 'Spring' is visible in the current Configuration.

At this point, one may be wondering what the term meta-meta model means. To understand this concept, assume that the Fact, Window 1/Contains/Pane 1 is part of the design model. The Fact,

Type:Window/Contains/Type:Pane is part of the meta model for design models about Windows and Panes. The meta model defines all the Types, Verbs, and their relations that can exist in a design model for a problem domain.

Now, the Facts,

| Type:Verb / | Is Singular / | Type:Value |
| Verb:Is Singular / | Value List / | Value:true |
| Verb:Is Singular / | Value List / | Value:false | are part of the meta-meta model. This level defines the built-in semantics used by the resolution engine. Stated differently, this level defines the terms in which any particular meta model can be defined. This level is the only level well-known to the resolution engine.

D. A Dynamic Resolution Engine that Implements and Exploits the Built-in Semantics.

Of course, in any given model, all of the objects, facts, metafacts, and so on, could be queried directly, ignoring the built-in semantics. Or, those semantics could be re-interpreted by some other set of algorithms. But the practical power of the present extensions is leveraged by the engine that interprets them. The present resolution engine is implemented as a software system, whose data structures are the extended semantic net. It is "hard-coded" to understand the Types and Verbs at the meta-meta model level, but can apply these ideas to any design meta-model.

At read time (that is, the time the object model is being queried, for example by a function such as, 'GetFacts( )'), this resolution engine both resolves visibility and sequence of object properties, using selected Variants; and resolves inherited properties and relations.

In the Application Designer implementation, inheritance is dynamic, instance-based, multi-parent, and multi-generational. Dynamic, as used in this context, means that an ancestor's properties are relevant at every query, not just at descendant creation. Instance-based means that every object, or node, can do its own inheriting, not just their Types; and, that resolved property values can be inherited, not just property definition. Multi-parent (multiple inheritances) means that every object can have an arbitrary list of immediate ancestors. And multi-generational means that every object is capable of being both an ancestor and a descendant; the inheritance lattice can be extended arbitrarily from any node, indefinitely.

In addition, inheritance of containment automatically replicates (deep copies) the inherited contents, rather than references to the parent's content. For example,

| Window 1 / | Contains / | Pane 1 |
| Window 2 / | Is a / | Window 1 | means

| Window 2 / | Contains / | Pane 2 |
| Pane 2 / | Is a / | Pane 1 | so that, subsequent revisions to Window 2's Pane 2 have no effect on Window 1's Pane 1. By contrast, Window 2's Pane 2 will inherit all subsequent changes to Window 1's Pane 1, in the same way that Window 2 inherits from Window 1, for all properties it does not specifically override.

At put time, (that is, at the time the object model is being modified, for example by a function such as, 'AddFact( )'), the engine validates caller input by Type/Verb, Value List, cardinality, authority, etc.

inserts the new Fact by Sequence.

FIG. 1 (represented as a UML diagram) illustrates a class structure implementation that supports the first 3 of the present extensions. Most of the classes shown in this illustration represent Types that are built-in to the meta-meta model. There is one instance of class, tvObjType, for each (non-abstract) class shown. For example, instances of class, tvStack, all point to the instance of tvObjType whose name is, 'Stack'. Instances of class, tvValue, all point to the instance of tvObjType whose name is, 'Value'.

There is also one instance of tvObjType for each Type defined at the meta model level. But there are no separate classes in the resolution engine for all these types. Each new design model object is represented by an instance of class, tvObject. Any tvElem can tell you its type, but not its name. Only tvObjects have names.

In brief, tvValues are just passive data, as strings; tvObjects are the things that have properties; and tvFacts are the links, either from a tvObject to a tvValue (value property), or to another tvObject (object relations). Every tvFact always has a Subject, a Verb, a Target, and a Variant. Subjects can be either tvObjects or other tvFacts, but never tvValues. tvValue is a terminal type. (Relatively few tvFacts have other tvFacts as either Subject or Target.)

Some of the arrows in the diagram are themselves actually carried as tvFacts—those labeled, 'Includes', 'Contains', and 'Current Stack'. (The labels are the names of the tvVerbs.) All the tvFacts about all the tvMetaObjs are in Variant, 'Default Variant'. They are always visible, regardless of tvSession. By contrast, tvFacts about tvObjects that belong to any of the design types, can be in any tvVariant. They are then visible, only as exposed by the tvSession's settings.

tvStack is an ordered set of tvLayers. The tvLayers are reusable by different tvStacks. The tvStack determines which tvLayers, in which order, are available to the tvSession. tvLayer is a special kind of tvVerb, because the tvSession uses the tvLayer to select one of that tvLayer's tvVariants.

There are at least 2 sets of comparisons that are relevant for understanding the advantages provided by the present invention. One can compare the present extended semantic net scheme to a conventional semantic net that lacks these extensions. Then, one can compare the usefulness of the result, as extended, to normal, conventional object models, which do not use semantic nets at all.

In order to get different answers to the same questions, under different conditions, the present extended semantic net atomizes every property of every object to a separate Fact, conditioned by a Variant. Other object models would typically rely on "adapter classes". Adapter classes have 2 disadvantages: the particular adapters needed must be anticipated, in source code, when the software tools are compiled; and, it is difficult to avoid having as many adapter classes as there are configuration possibilities, for each adapted class (object type). By contrast, a single, data-driven resolution engine configured in accordance with the present invention, efficiently handles any number of un-anticipated object types, properties, and configuration permutations, by applying algorithms in a consistent way.

Conventional semantic nets consist only of labeled (semantic) links and nodes, which are quite distinct. Nothing is both a node and a link at the same time. This considerably restricts their ability to capture qualified meanings. Conventional semantic nets also lack an embedded meta-model, to define which new utterances are valid and which are not. Or, if such rules are brought to it from outside, they are not soft-coded within the net itself, so that new Types, Verbs, and rules are no more difficult to add than new data instances. Finally, conventional semantic nets do not typically support object modeling.

The present invention also allows for a mapping to RDBMS schema that maximizes the value of cheap indexes. This allows:

immediate, indexed access to links from either end, or by Variant;

multi-user update with conflict detection and transactions; and efficient traversal of selected data, when the total data set is very large.

All of these issues have been problems for other approaches to object model persistence, both in OODB as well as OO/RDB boundaries, when no semantic net intervenes. They are resolved through use of the present invention.

Thus, extensions for a semantic net have been described. In the foregoing description several examples were used to highlight features of the present invention, however, those examples were not meant to be restrictive of the present invention. Thus, the inventions should be measured only be the claims, which follow.

What is claimed is:

1. A method, comprising:

storing first data representing a semantic network, the semantic network representing a plurality of nodes, and a plurality of links interconnecting the nodes such that, for each of the links, one of the nodes is a subject node of the link, another of the nodes is a target node of the link, and the respective link represents a verb between the corresponding subject and target nodes, at least some of the links each being conditioned by at least one variant;

receiving second data representing one or more of the variants;

determining, by a computer, a portion of the semantic network that contains fewer links than the semantic network depending upon which of the variants are included in the second data and which of the variants condition the at least some of the links; and generating third data based on the determined portion of the semantic network.

2. The method of claim 1, wherein some of the links of the semantic network are visible in the portion of the semantic network and others of the links are not visible in the portion of the semantic network.

3. The method of claim 2, wherein determining comprises determining the portion of the semantic network such that those of the links conditioned by a variant represented by the second data are visible, and those of the links conditioned by a variant that is not represented by the second data are not visible.

4. The method of claim 2, wherein the second data represents an ordered stack of a plurality of variants, and wherein determining comprises determining the portion of the semantic network such that some of the links are visible and others of the links are not visible, depending upon both whether the variants that condition the at least some of the links are included in the second data and an order of the variants in the stack.

5. The method of claim 1, wherein the semantic network further comprises a further link having one of the plurality of links as a subject or target of the further link.

6. The method of claim 1, wherein the semantic network further comprises a further link having one of the plurality of links as a subject of the further link and another of the plurality of links as a target of the further link.

7. The method of claim 1, wherein the semantic network represents an object model of an interactive television application.

8. The method of claim 7, wherein the object model represents interactive screens for the interactive television application.

9. The method of claim 1, wherein the semantic network represents an object model.

10. The method of claim 9, wherein the object model represents information content over the Internet.

11. The method of claim 1, wherein the third data identifies the portion of the semantic network.

12. The method of claim 1, wherein the at least some of the links are each conditioned by a plurality of variants.

13. An apparatus, comprising:

a processor; and a memory coupled to the processor and storing first data representing a semantic network, the semantic network representing a plurality of nodes, and a plurality of links interconnecting the nodes such that, for each of the links, one of the nodes is a subject node of the link, another of the nodes a target node of the link, and the respective link represents a verb between the corresponding subject and target nodes, at least some of the links each being conditioned by at least one variant, wherein the processor is configured to, in response to receiving second data representing one or more variants:

determine a portion of the semantic network that contains fewer links than the semantic network depending upon which of the variants are included in the second data and which of the variants condition the at least some of the links, and generate third data based on the determined portion of the semantic network.

14. The apparatus of claim 13, wherein some of the links of the semantic network are visible in the portion of the semantic network and others of the links are not visible in the portion of the semantic network.

15. The apparatus of claim 14, wherein the processor is further configured to determine the portion of the semantic network such that those of the links conditioned by a variant represented by the second data are visible, and those of the links conditioned by a variant that is not represented by the second data are not visible.

16. The apparatus of claim 14, wherein the second data represents an ordered stack of a plurality of variants, and wherein the processor is further configured to determine the portion of the semantic network such that some of the links are visible and others of the links are not visible, depending upon both whether the variants that condition the links are included in the second data and an order of the variants in the stack.

17. The apparatus of claim 13, wherein the semantic network further comprises a further link having one of the plurality of links as a subject or target of the further link.

18. The apparatus of claim 13, wherein the semantic network further comprises a further link having one of the plurality of links as a subject of the further link and another of the plurality of links as a target of the further link.

19. The apparatus of claim 13, wherein the semantic network represents an object model of an interactive television application.

20. The apparatus of claim 19, wherein the object model represents interactive screens for the interactive television application.

21. The apparatus of claim 13, wherein the semantic network represents an object model.

22. The apparatus of claim 21, wherein the object model represents information content over the Internet.

23. The apparatus of claim 13, wherein the third data identifies the portion of the semantic network.

24. The apparatus of claim 13, wherein the at least some of the links are each conditioned by a plurality of variants.

25. A method, comprising:
    storing first data representing a semantic network, the semantic network representing a plurality of nodes, and a plurality of links interconnecting the nodes such that, for each of the links, one of the nodes is a subject node of the link, another of the nodes a target node of the link, and the respective link represents a verb between the corresponding subject and target nodes, and wherein the semantic network also comprises a further link having one of the plurality of links as a subject or target of the further link;
    receiving, at a computer having access to the first data, a query; and
    responding, by the computer, to the query with a response that depends upon which one of the plurality of links is the subject or target of the further link.

26. The method of claim 25, wherein each of the plurality of links is conditioned by a variant, the method further comprising, in response to receiving second data representing an ordered stack of a plurality of variants, determining a portion of the semantic network such that some of the links are visible and others of the links are not visible, depending upon whether the variants represented by the links are included in the second data and an order of the variants in the stack.

27. The method of claim 25, wherein the semantic network represents an object model of an interactive television application.

28. The method of claim 27, wherein the object model represents interactive screens for the interactive television application.

29. The method of claim 25, wherein the semantic network represents an object model.

30. The method of claim 25, wherein the object model represents information content over the Internet.

* * * * *